United States Patent
Schaede

(10) Patent No.: US 7,384,495 B2
(45) Date of Patent: Jun. 10, 2008

(54) MACHINE FOR APPLYING AND CUTTING STRIPS OF LAMINATE

(75) Inventor: Johannes Georg Schaede, Würzburg (DE)

(73) Assignee: KBA-Giori S.A., Lausanne (CH)

( * ) Notice: Subject to any disclaimer, the term of this patent is extended or adjusted under 35 U.S.C. 154(b) by 414 days.

(21) Appl. No.: 10/554,640

(22) PCT Filed: Apr. 16, 2004

(86) PCT No.: PCT/EP2004/004041

§ 371 (c)(1),
(2), (4) Date: Oct. 25, 2005

(87) PCT Pub. No.: WO2004/096541

PCT Pub. Date: Nov. 11, 2004

(65) Prior Publication Data

US 2006/0283542 A1    Dec. 21, 2006

(30) Foreign Application Priority Data

Apr. 30, 2003 (EP) .................................. 03009913

(51) Int. Cl.
*B32B 37/00* (2006.01)
(52) U.S. Cl. ...................................... 156/256; 156/521
(58) Field of Classification Search ................ 156/250, 156/256, 510, 517, 521, 555, 582
See application file for complete search history.

(56) References Cited

U.S. PATENT DOCUMENTS

| | | | |
|---|---|---|---|
| 5,051,147 A | 9/1991 | Anger | |
| 5,456,789 A | 10/1995 | Boucher | |
| 6,190,489 B1 | 2/2001 | Akitomo et al. | |
| 6,513,221 B2 * | 2/2003 | Vogt et al. | 29/429 |
| 6,723,199 B1 * | 4/2004 | Akitomo et al. | 156/248 |
| 6,810,934 B2 * | 11/2004 | Sasaki et al. | 156/521 |
| 2002/0166635 A1 | 11/2002 | Sasaki et al. | |
| 2003/0075277 A1 | 4/2003 | Vogt et al. | |

FOREIGN PATENT DOCUMENTS

| | | |
|---|---|---|
| DE | 33 34 009 A1 | 5/1985 |
| EP | 0 888 239 B1 | 1/1999 |
| EP | 0 888 240 B1 | 1/1999 |
| EP | 1 291 195 A1 | 3/2003 |
| EP | 1 345 166 A1 | 9/2003 |
| EP | 1 361 028 A1 | 11/2003 |
| EP | 1 398 174 A1 | 3/2004 |
| WO | WO 95/10420 A1 | 4/1995 |
| WO | WO 97/35721 A1 | 10/1997 |
| WO | WO 99/14433 A1 | 3/1999 |

* cited by examiner

*Primary Examiner*—James Sells
(74) *Attorney, Agent, or Firm*—Crompton, Seager & Tufte, LLC

(57) ABSTRACT

The machine comprises a substrate feeder (1,3,10,11), a laminate feeder (14,15,16) and application means (12,18) for applying said laminate to said substrates. It further comprises cutting means (17,22,23,24) for cutting said laminate (13) betw successive substrates (2) during application of said laminate (13) on said substrates (2).

14 Claims, 4 Drawing Sheets

MACHINE FOR APPLYING AND CUTTING STRIPS OF LAMINATE

The present invention concerns a machine for applying strips of laminate to planar substrates and for cutting said strips once applied.

The present invention also concerns a process for applying strips of laminate to planar substrates and for cutting said strips once applied.

In the field of banknotes and securities, there has been increasing needs for security features protecting against counterfeiting. Indeed, in the past years, computers, scanners and copy machines have been extensively developed and today, it is possible to buy very performing devices at a reasonable price. Since these devices are more performing, it has been at the same time necessary to develop new and improved security features for securities, such as banknotes, checks, cards (i.e. credit cards), ID cards, passports etc. which would not allow them to be copied by standard computers or scanners, or even modern color copy machines.

Such security features include special inks, so called optical variable inks, used to print specific patterns on the substrate of the note, optical variable devices in the shape of metallized patches or holograms, or also specific patterns, such as moiré patterns and other similar patterns, all of which are very difficult if not impossible copy by actual devices, but, on the other hand, are easy to control visually.

Other security means include combinations of superimposed lines and/or patterns with colors which are only visible under specific conditions, for example UV light or by transparency. Again, the interest of such security means is that they may easily be printed or placed on the document to be protected and also be controlled by simple devices, even visually, but they are impossible to reproduce with actual printers, scanners or copy machines.

Another specific technique involves watermarks in which the paper substrate is marked with lines or patterns only visible in transparency. A further development of this technique concerns pseudo-watermarks consisting in the creation of a window in the substrate, especially in paper-based substrates which are normally not transparent, said window being transparent.

It is however very difficult to create or simulate a transparent window in a paper-based substrate. Transparent windows, as such, are widely used in polymer-based substrates for banknotes and securities, in order to form security elements. These polymer based substrates are usually completely transparent, therefore, to create a transparent window, it is only necessary to leave the chosen zone free of printing. However, in the case of paper, a non-transparent substrate as such, a first process has been developed according to which, it is possible to reduce locally the thickness of the paper in order to create a transparent window in the substrate. PCT application WO 99/14433 for example discloses this process and the content of this application is incorporated by reference in the present application. According to this known process, a soaking solution is applied on at least one surface of the paper in one or several predetermined zones, then pressure and heat are applied on the soaked zone so as to evaporate and increase the density of the paper in said zone relative to the rest of the paper. Thus, these zones have a reduced thickness with respect to the rest of the paper and become transparent.

This first technique however has the drawback of weakening locally the paper in the zone comprising the window. In particular, the reduced thickness of the window weakens the substrate. Banknotes using such a technique thus have a reduced lifetime and must be exchanged, i.e. new bank notes must be printed to replace the older damaged ones.

Another technique implies to cut a hole directly in the paper in order to create the transparent window. For example, PCT application WO 95/10420, the content of which is incorporated by reference in the present application, discloses said other technique. It is of course necessary to cover the hole cut in the substrate, which is done in this case by covering the hole with a strip of transparent material, e.g. a foil or a laminate. This document specifically uses the contrast between the transparency of the window and a diffraction structure used as an additional security feature and placed inside the window. Modern copy machines and scanners are indeed unable to copy a diffraction structure and also a transparent window.

European patent application No. 02405368.8 "Machine for cutting openings in a substrate" filed on May 6, 2002 in the name of KBA-GIORI S.A., the content of which is incorporated by reference in the present application, discloses a machine for cutting openings, such as windows, in a planar substrate, for example a paper substrate.

In the cases mentioned above, the substrate is weakened, either by its reduced thickness, or by the absence of material (cut hole), therefore there is a need to use reinforcing means for such substrates. One reinforcing means of particular interest is made with a strip of transparent laminate made of an appropriate material, such as, but not limited to, Polyester (PET) or Polycarbonate (PC) films. Other materials known in the art are of course possible. The strip of material is attached to the substrate by conventional techniques such as gluing or other equivalent methods known in the art. An example of application of such a strip of laminate is disclosed in the European patent application No. 02405782.0 filed on Sep. 10, 2002 in the name of KBA-GIORI S.A., the content of which is incorporated by reference in the present application.

A strip of laminate may be used also to add a security element to the substrate, in the field of securities, such as a banknotes, checks and other similar products. As indicated in EP application No. 02405782.0 cited above, additional security elements could be placed on the securities, in particular directly on the zone with a reduced thickness, i.e. the transparent zone. One example of a security feature which is particularly advantageous to use in the present application is disclosed in Swiss Patent application No. 1661/01 filed on Sep. 7, 2001 in the name of KBA-GIORI S.A., the content of this Swiss Patent application being incorporated by reference in the present application. The security feature for printed matter described in this application comprises a first drawing printed on one side of said printed matter, said drawing being made of a first set of geometrical shapes, and a second drawing printed on another side of the printed matter in register with a second set of geometrical shapes corresponding to the first set, but in which one of said sets comprises offset sectors so that when the recto-verso register is correct, the security feature forms zones of variable density that can be seen only in transparency.

In addition, strips of laminate may be used to protect security elements placed on the substrate, in particular when the substrate forms securities, such as banknotes, checks, ID cards, credit cards and other similar objects. Typical security elements are disclosed for example in the European patent application No. 02405203.7 filed on Mar. 15, 2002 in the name of KBA-GIORI S.A., the content of which is incorporated by reference in the present application. Other security elements are of course known in the art of securities. Once the security elements have been placed on the substrate, either by printing (for example with, but not limited to, optically variable inks), depositing of specific material (for example, but not limited thereto, with so called optically variable devices), patches and other known elements, the security element is covered by a strip of transparent laminate as a protection to avoid its deterioration with time.

It is therefore an aim of the invention to improve the known machines and methods.

More specifically, it is an aim of the present invention to improve the machines for applying laminate on substrates.

Another aim of the invention is to provide a machine which is able to apply at least a strip of laminate on successive substrates and to cut said strip or strips between said substrates once the strip or strips has been applied.

Accordingly, the present invention is defined by the features the claims.

The present invention will be better understood by the description of several embodiments with the accompanying drawings in which.

Figure 1:
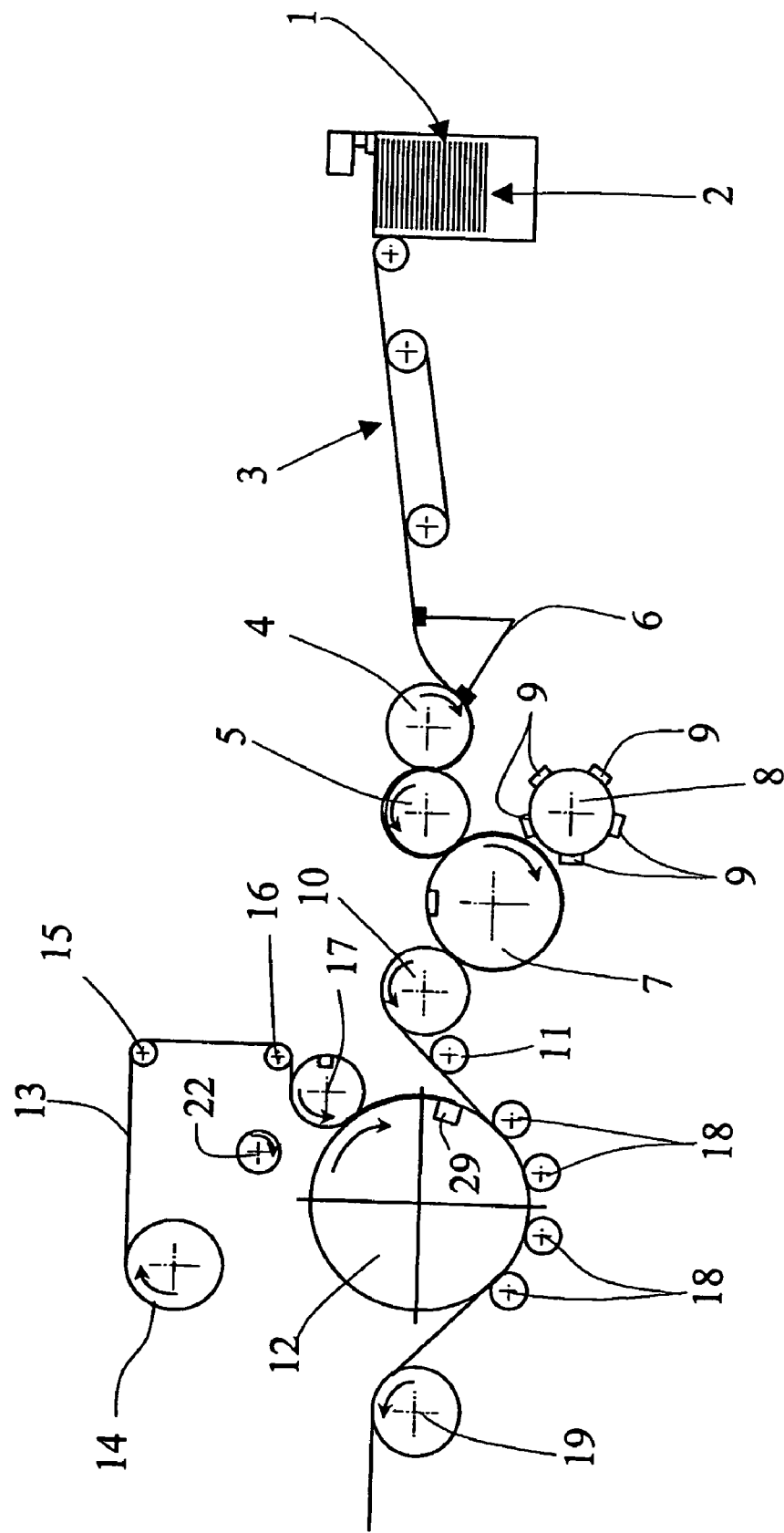
FIG. 1 shows an embodiment of the machine according to the invention.

An example of an embodiment of a machine according to the invention is described in a detailed manner with reference to FIG. 1 which shows the principle of functioning of the machine. The machine disclosed is a machine which first cuts an opening in the substrate as will be explained later in this application.

Accordingly, the processing machine is combined with a feeding unit 1 which provides the machine with planar substrates 2, such as sheets of paper. The feeding unit has a feeder cooperating with a transporting section 3, for example a chain gripper system or a suction belt or any other equivalent system known in the art, which feeds the machine with successive substrates 2, such as sheets of paper, in a continuous manner. Such a feeding unit is known per se in the art of printing machines for securities.

The substrates or sheets 2 arriving at the end of the transporting section 3 cooperating with the feeder are then taken by first and second transfer cylinders 4, 5 by appropriate means, for example a swinging transfer device 6, know per se in the art. The second transfer cylinder 5 delivers the successively fed sheets 2 to a counter cylinder 7 which is used to support the sheets 2 while openings are being cut in the successive substrates 2 by a cutting cylinder 8 supporting cutting tools 9. The principle of such a machine for cutting openings in a planar substrates, such as sheets of paper, is disclosed and described in European patent application No. 02405368.8 filed on May 6, 2002 in the name of KBA-GIORI S.A. The content of this application is enclosed by reference in the present application for the disclosure of a machine for cutting openings in a planar substrate.

Such a cutting machine disclosed in this European patent application No. 02405368.8 comprises at least a cutting tool 9 and a counter cylinder 7 supporting the substrate 2 and driving said substrate 2 with gripper means (not shown) around a first axis of rotation, a cutting cylinder 8 supporting the cutting tools 9 having the shape of the opening to be cut, said cutting cylinder 8 rotating around a second axis of rotation parallel to the first axis of rotation, said second axis being further mounted on lateral displacement means to bring said cutting cylinder 8 in a cutting position with respect to the counter cylinder 7, and evacuation means (not shown) to evacuate the cut part of said substrate 2. All these elements are not shown in a detailed manner in FIG. 1, however, the entire principle and device exposed in this European patent application No. 02405368.8 are enclosed by reference in the present application and is applicable to the machine of FIG. 1 for the sake of completeness of the present description.

Once the necessary openings have been cut in the substrate or sheet 2, for example with a machine as disclosed in European patent application No. 02405368.8, the sheet 2 is taken away from counter cylinder 7 by transfer drum 10 and brought to the part of the machine in which a strip of laminate 13 is applied to the successive sheets 2. This part of the machine is similar to the transporting and application machines that have been disclosed in PCT applications WO 97/35721, WO 97/35794 and WO 97/35795, the content of which is enclosed by reference for the sake of completeness of the present application.

The cut substrate 2 is thus taken over by transfer drum 10, preferably driven by a speed-controllable and/or position controllable motor and transferred to a further drum, for example a suction drum 11. This suction drum 11 has a dedicated speed-controllable and/or position controllable motor by means of which, the circumferential speed of the drum 11 can be decreased with respect to the machine speed (for example the circumferential speed of the processing cylinder 12) such that the distance between successive sheets of substrate 2 can be reduced before they undergo the process of application of laminate 13 with the processing cylinder 12. Thus, the quantity of laminate 13 necessary to cover a given number of sheets 2 can be reduced due to the fact that the distance between successive sheets 2 is reduced, and less laminate is lost between the sheets.

The laminate 13 is carried on a roll 14 and is brought from an unwinding station comprising said laminate roll 14 and guide rolls 15, 16 to a laminate cutting and feeding station. Preferably, the laminate is transparent or partially transparent polyester film with a thickness of about 12 to 15 µm with a glue which is thermoplastic or UV curable or with two components or activable by other means.

The laminate 13 is transferred from cylinder 17 to cylinder 12 at the contact point of these cylinders as shown in FIG. 1 and follows then cylinder 12 in order to be applied to the substrate, i.e. successive sheets 2 fed in to the machine.

Once the laminate 13 has been applied against the successive sheets 2 of substrate and has been cut between successive sheets 2, the application process is continued by successive pressure rolls 18 in order for the laminate 13 cut into a strip of laminate to be properly applied on the sheet of substrate 2. When the application process is finished, the successive sheets of substrate 2 are taken away for further treatment over cylinder 19, which is preferably a cooling cylinder.

Figure 2:
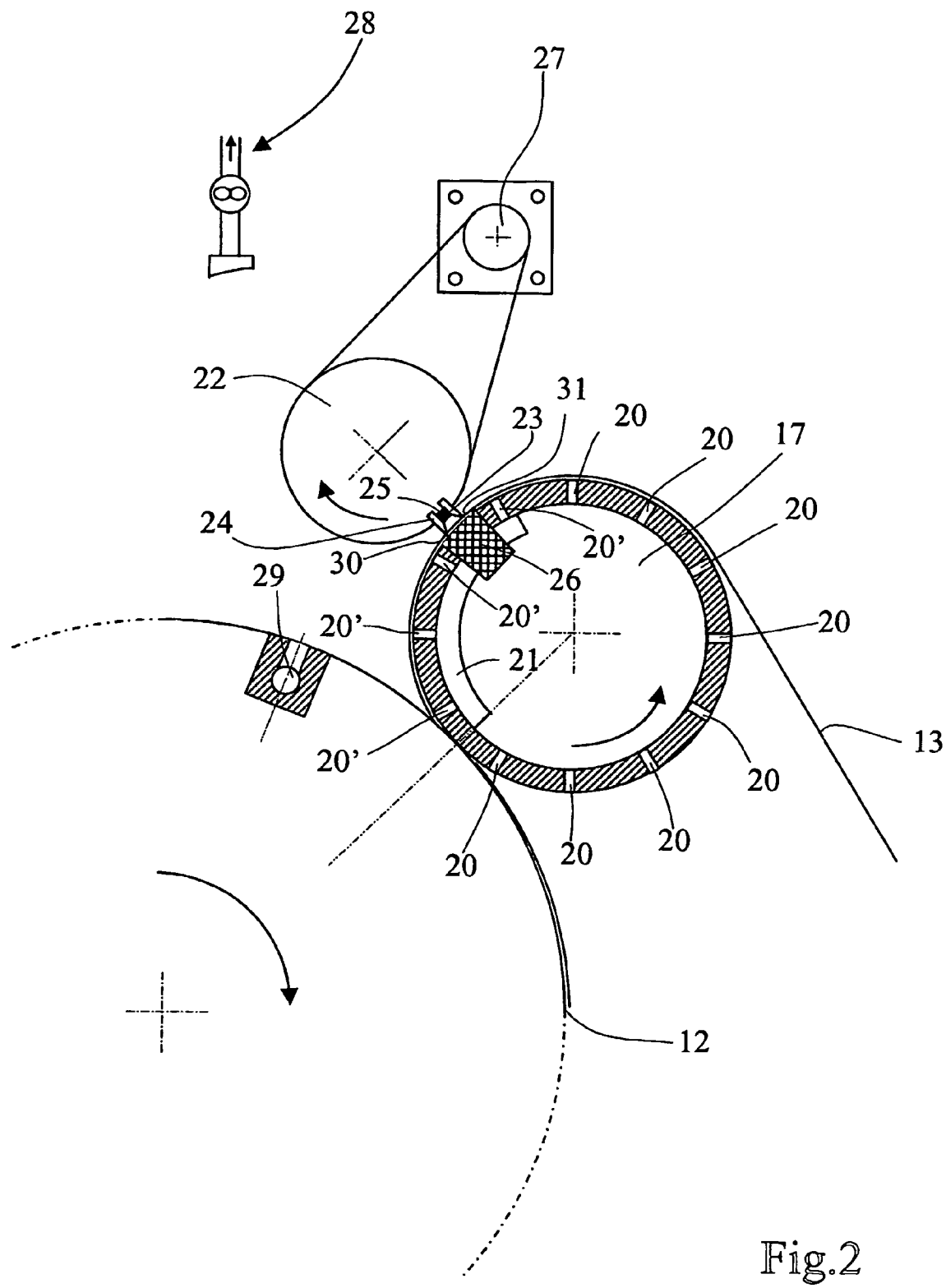
FIG. 2 shows a detailed view of the cutting system for the laminate according to the invention in a first position.

The laminate feeding and cutting station of the machine is described in more detail with reference to FIGS. 2 to 4 of the present application. As shown in FIG. 2, the laminate 13 is drawn from roll 14 (see FIG. 1) by suction cylinder 17 which comprises a circumferential surface with holes 20, 20' and an aspiration segment 21 for drawing the laminate 13 with the suction cylinder 17. The aspiration segment 21, known in the art, is fixed with respect to the cylinder 17 and is connected to a source of air under depression. When the holes 20 of the cylinder 17 open in the aspiration segment 21 on the inner side of the surface, they are referenced with the number 20', the air under depression in the aspiration segment 21 also acts upon the laminate 13 through holes 21' thus allowing the cylinder 17 to draw the laminate 13 in rotation with itself, the laminate being held against the surface of cylinder 17 by the air under depression.

The cutting system used for cutting the laminate works in a manner similar to the one described in European patent application No. 02405368.8 filed on May 6, 2002 in the name of KBA-GIORI S.A., the content of which has been incorporated by reference in the present application. It comprises a cutting cylinder 22, represented in its cutting position in FIG. 2, that is close to the suction cylinder 17. The cutting cylinder 22 further comprises at least two blades 23, 24 forming a cutting tool with, preferably, a soft part 25 placed between the blades 23, 24. According to the principles explained in the incorporated European Patent application No. 02405368.8, in order to cut the laminate 13, the cutting cylinder 17 is displaced in the direction of cylinder 17 to bring the cutting blades 23, 24 in contact with counter part 26 in cylinder 17. Said counter part 26 is preferably made of a hard material (i.e. Polycell) and allows carrying out the cutting operation by pressure of the blades 23, 24 of the cutting cylinder 22 against the counter part 26 of the suction cylinder 17. The cutting cylinder 22 is preferably driven by an independent drive 27, for example a motor, as shown in FIG. 2 to have the possibility of varying its speed.

Figure 3:
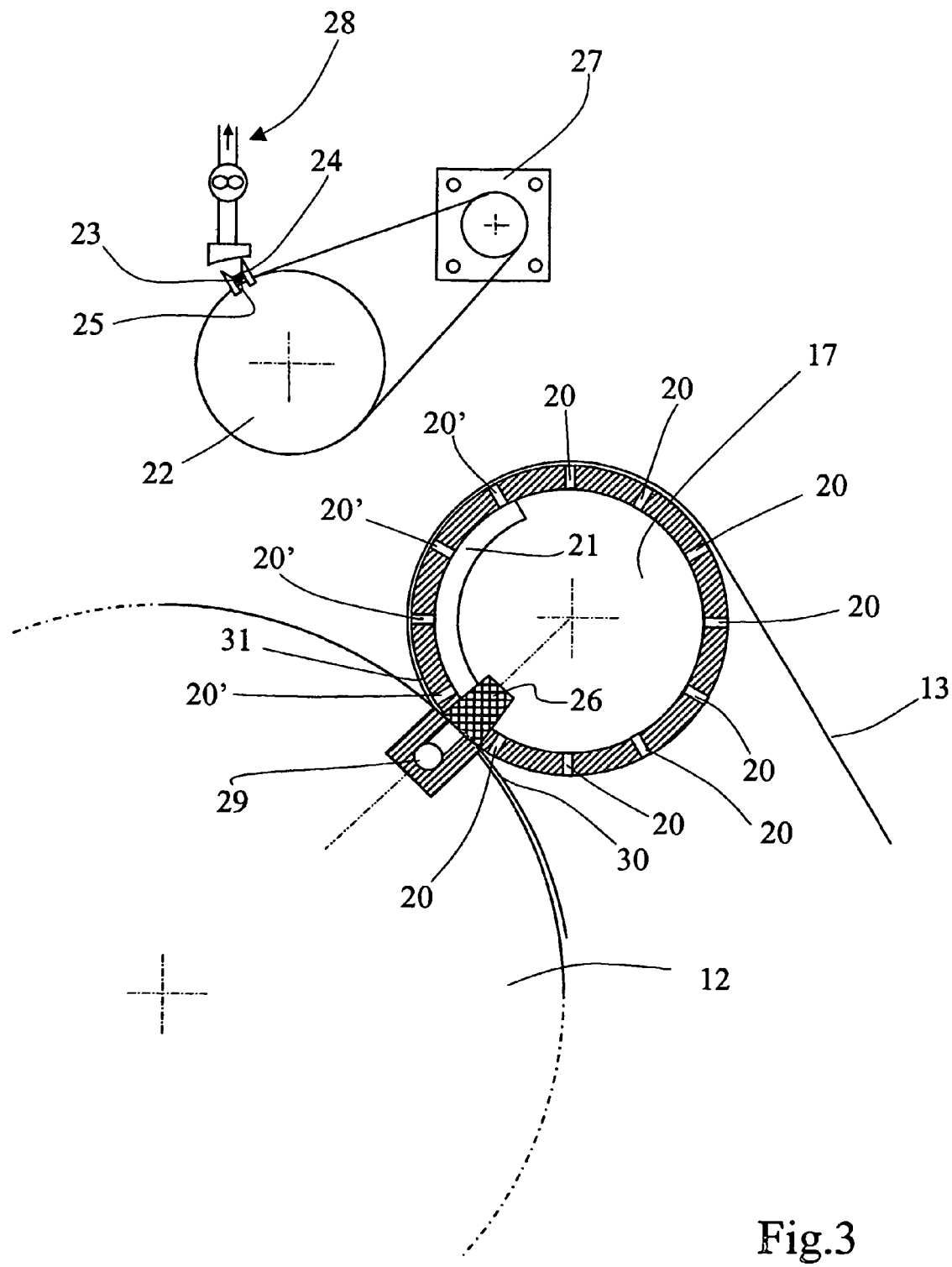
FIG. 3 shows a detailed view of the cutting system for the laminate according to the invention in a second position.

Once the cutting operation has been carried out, that is the blades 23, 24 have cut a laminate part by a movement of the cylinder 22 towards the suction cylinder 17 until the blades 23, 24 have reached the counter part 26, the cutting cylinder 22 is moved away from cylinder 17 as is represented in FIG. 3, through known means, and rotated by drive 27 so that the cut part of the laminate, which is now between both blades 23, 24, can be taken by an evacuation system 28, for example by aspiration. The elastic part 25 placed between blades 23, 24 facilitates the evacuation of the cut part of laminate in the system 28.

To displace the cutting cylinder 22 towards the cylinder 17 and away from said cylinder 17, many equivalent systems can be used, for example an eccentric mechanism or a lever mechanism.

The laminate 13 transported by the cylinder 17 after the cutting operation now comprises a segment of laminate, the leading part of which has been transferred on the cylinder 12 according to the process described further in this application and the trailing end 30 of which lies approximately on counter part 26, where the cutting has been made. Next to said trailing end 30 of the segment of laminate, on the counter part 26, the leading end 31 of the laminate 13 being fed to the machine is situated, the separation between the trailing end of the segment 30 and the leading end 31 of the laminate 13 having been created by the cutting operation described above.

While the suction cylinder 17 continues its rotation drawing the laminate 13, the counter part 26 arrives in contact with cylinder 12, both cylinders 17 and 12 being coordinated such that the trailing edge of counter part 26 contacts an aspiration strip 29 of the cylinder 12. Indeed, once the cutting has been carried out, the leading edge of counter part 26 is covered by the trailing end 30 of a segment of laminate, whereas the middle part of counter part 26 is not covered by laminate anymore since this part of laminate has been cut away by the above described cutting operation, and the trailing edge of the counter part 26 is covered by the leading end 31 of laminate 13.

At this contact point, the aspiration segment 21 of the cylinder 17 is ended so that the segment of laminate is freed from the cylinder 17, and thus able to be transferred onto cylinder 12 and may follow the cylinder 12 for further processing and application to a substrate being taken away by the aspiration strip 29. The leading end 31 of the laminate 13 is at this moment applied against the aspiration strip 29 of the cylinder 12 and is accordingly transferred from cylinder 17 to cylinder 12, the same place corresponding to the end of the aspiration segment 21, and subsequently follows cylinder 12 by further rotation of cylinders 17 and 12 therefore continuing the transfer process of the laminate 13 from cylinder 17 to cylinder 12 and then its application to a substrate 2.

Figure 4:
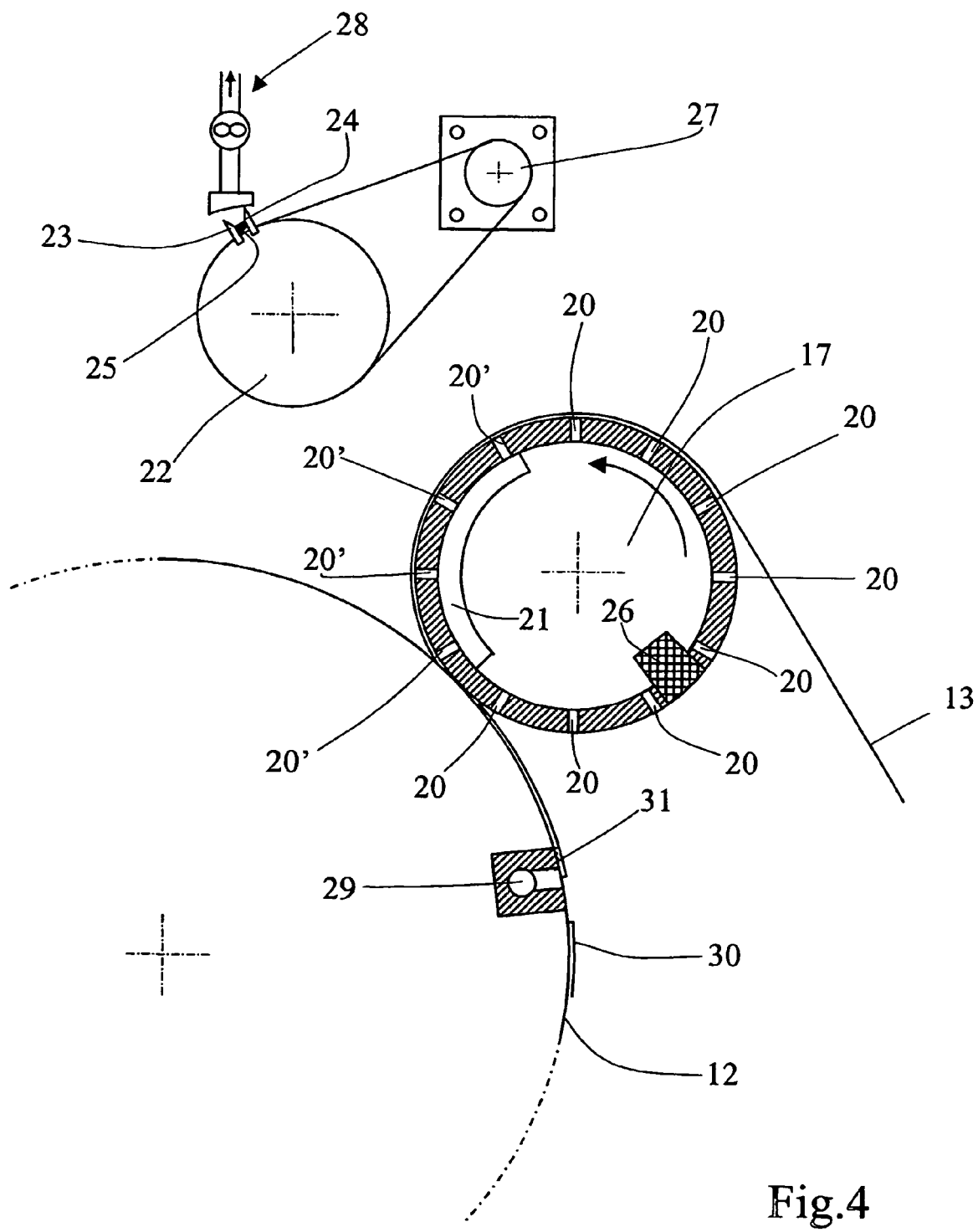
FIG. 4 shows a detailed view of the cutting system for the laminate according to the invention in a third position.

This is shown in FIG. 4 which discloses the situation when the cylinders 17 and 12 have been further rotating, therefore further transferring the laminate 13 from cylinder 17 to cylinder 12 before the laminate 13 is cut to form a segment of laminate.

To describe the further processing of laminate 13 drawn along by cylinder 12, reference is made to FIGS. 1 and 4. The leading end 31 of laminate 13 is drawn by aspiration strip 29 with cylinder 12 and is then applied against a sheet of substrate 2 when they meet near the first one of rolls 18. The laminate 13 is situated between cylinder 12 and substrate 2 and is applied against the substrate 2 by the successive rolls 18, for example heating rolls, which heat the assembly of substrate and laminate, hence for example activating a attachment agent, such as glue, of the laminate in order for the laminate to be properly attached to the substrate 2 and remain on the substrate 2 once it has been cut by the cutting system described above.

Several techniques can be used to avoid that glue is activated in the window cut in the substrate. For example, one may selectively apply glue on the laminate, or selectively activate the glue (by heat, light or other means), or one may selectively apply pressure with rolls 18.

To selectively apply glue on the laminate, one can use a glue application system with an application roll 31 as shown schematically in FIG. 1, said system and roll 31 depositing glue onto the segment of laminate carried by cylinder 12. Since the segment of laminate is in register with the substrate 2, it is possible selectively apply the application roll 31 to deposit the glue only on the part of the segment of laminate that will be effectively in contact with the substrate and not on the surface of the segment of laminate that covers the window cut in the substrate 2.

Another way can be to selectively activate the glue deposited on the laminate 13, for example by exchanging the application roll 31 by an activation means in front of which the segment of laminate passes. Accordingly, the glue will only be activated where the segment of laminate will contact the substrate, and the surface of the segment of laminate covering the window of the substrate 2 will not be activated.

According to another possibility, one can selectively apply pressure and heat with the rolls 18, thereby activating the glue by the combination of pressure and heat and relieving the pressure applied by rolls 18 along the part of the substrate that comprises the cut window. The relieve of pressure could be done by moving the rolls 18 away from the cylinder 12, or by an opening cut in the surface of the rolls that corresponds to the window cut in the substrate 2.

Another option is to use a two components glue with one component being applied on the substrate and the other component being applied on the laminate. The glueing process will then only be activated when both components are present, therefore this would not be the case where the window has been cut in the substrate thus avoid the selective techniques described above.

To improve the efficiency of the system, it would also be possible to combine the different possibilities indicated above. In another variant, it could be possible to pre-process the film and to deposit a thermoactivable glue selectively on the film and in register with the holes or windows cut in the substrate.

When the laminate application operation has been carried out, the substrate 2 with the applied segment of laminate is taken away by cylinder 19, which is preferably a cooling cylinder, and undergoes further processing, such as printing, quality control etc.

The embodiments of the invention have been given as examples and variations are possible within the scope of the present protection. In particular, the laminate cutting system could be used in any machine in which such laminate is applied to successive sheets of substrate, and not only in a machine in which a window is cut in the successive sheets, the aim being to be able to cut the laminate between successive sheets on which it has been applied.

The invention claimed is:

1. Machine for applying a strip of laminate to successive planar substrates, in particular sheets of paper, said machine comprising:
    application means for applying said laminate to said substrates;
    a substrate feeder for feeding successive substrates to said application means;
    a laminate feeder for supplying laminate to said application means; and
    cutting means for cutting said laminate between successive substrates, said cutting means including a counter cylinder and a cutting tool which can be brought into contact with said counter cylinder to cut the laminate into successive strips of laminate,
    characterized in that said application means comprises a processing cylinder in contact with said counter cylinder for transporting and applying the laminate onto said substrates, said counter cylinder and processing cylinder being adapted and coordinated to allow transfer of a leading end of the laminate cut by said cutting tool from said counter cylinder to said processing cylinder and to draw along the cut laminate before the laminate is again cut by said cutting tool to form a strip of laminate.

2. Machine according to claim 1, wherein the cutting means comprises a cutting cylinder carrying the cutting tool.

3. Machine according to claim 2, wherein the cutting cylinder comprises at least two blades on its outer circumference forming said cutting tool.

4. Machine according to claim 3, wherein a soft part is placed between said blades.

5. Machine according to claim 2, wherein the cutting cylinder is displaceable laterally with respect to the counter cylinder.

6. Machine according to claim 2, wherein said cutting cylinder is driven by an independent drive.

7. Machine according to claim 2, wherein the counter cylinder comprises a counter part suitable for cooperation with said cutting tool.

8. Machine according to claim 1, further comprising an evacuation system for evacuating a cut part of said laminate.

9. Machine according to claim 1, wherein said counter cylinder comprises aspiration means for holding said laminate against the surface of the suction cylinder and drawing said laminate along in rotation with the counter cylinder.

10. Machine according to claim 9, wherein said aspiration means include an aspiration segment which is fixed with respect to the counter cylinder and a plurality of holes provided in the circumferential surface of the counter cylinder and adapted to open in said aspiration segment.

11. Machine according to claim 10, wherein said aspiration segment extends, along the direction of rotation of said suction cylinder, from a position located before the position where said cutting tool is brought in contact with the suction cylinder to a position corresponding to the contact point between said suction cylinder and said processing cylinder.

12. Machine according to claim 1, wherein said processing cylinder further comprises an aspiration strip for aspirating and transferring the leading end of the cut laminate from said counter cylinder to said processing cylinder and for drawing said leading end of the cut laminate in rotation with the processing cylinder.

13. Machine according to claim 1, wherein said substrate feeder comprises a drum with a dedicated speed-controllable and/or position controllable motor by means of which a circumferential speed of the drum can be decreased with respect to the circumferential speed of the processing cylinder such that the distance between successive substrates can be reduced before application of the laminate.

14. A process of applying a continuous strip of laminate onto successive planar substrates, in particular sheets of paper, and cutting said strip of laminate between two successive substrates, said process comprising the steps of:
    transporting the laminate by means of a first cylinder to a cutting tool;
    bringing the cutting tool in contact with said first cylinder to cut the laminate into strips of laminate; and
    applying the strips of laminate against the substrates, said process being characterized by transferring a leading end of the cut laminate from the first cylinder onto a second cylinder contacting the first cylinder before cutting again the laminate to form a strip of laminate which is applied against the substrate by said second cylinder.

* * * * *

UNITED STATES PATENT AND TRADEMARK OFFICE
CERTIFICATE OF CORRECTION

PATENT NO. : 7,384,495 B2  
APPLICATION NO. : 10/554640  
DATED : June 10, 2008  
INVENTOR(S) : Johannes Georg Schaede Page 1 of 1

It is certified that error appears in the above-identified patent and that said Letters Patent is hereby corrected as shown below:

On the Title Page item (57),
Abstract
Line 5, delete "betw", and insert therefor -- between --.

Signed and Sealed this

Ninth Day of September, 2008

JON W. DUDAS
*Director of the United States Patent and Trademark Office*